(12) United States Patent
He et al.

(10) Patent No.: US 9,452,771 B2
(45) Date of Patent: Sep. 27, 2016

(54) STEERING WHEEL COVER

(71) Applicants: Yu He, Ningbo (CN); Jiangqiang You, Ningbo (CN)

(72) Inventors: Yu He, Ningbo (CN); Jiangqiang You, Ningbo (CN)

( * ) Notice: Subject to any disclaimer, the term of this patent is extended or adjusted under 35 U.S.C. 154(b) by 301 days.

(21) Appl. No.: 14/072,621

(22) Filed: Nov. 5, 2013

(65) Prior Publication Data

US 2014/0053679 A1   Feb. 27, 2014

Related U.S. Application Data

(63) Continuation-in-part of application No. 13/623,211, filed on Sep. 20, 2012.

(30) Foreign Application Priority Data

Jun. 15, 2012   (CN) .......................... 2012 2 0296126

(51) Int. Cl.
*B62D 1/06*   (2006.01)

(52) U.S. Cl.
CPC .............. *B62D 1/06* (2013.01); *Y10T 74/2087* (2015.01)

(58) Field of Classification Search
CPC ................ B62D 1/06; Y10T 74/2087; Y10T 74/20876

See application file for complete search history.

(56) References Cited

U.S. PATENT DOCUMENTS

| | | | | |
|---|---|---|---|---|
| 3,802,291 | A * | 4/1974 | Young, Jr. ................ | B62D 1/06 74/552 |
| 8,980,983 | B2 * | 3/2015 | La Rosa ................ | C08L 23/02 524/424 |
| 2009/0095121 | A1 * | 4/2009 | Huang .................... | B62D 1/06 74/558 |
| 2014/0079935 | A1 * | 3/2014 | Broyles ..................... | C08J 5/18 428/220 |

* cited by examiner

*Primary Examiner* — Thomas Diaz
(74) *Attorney, Agent, or Firm* — Booth Udall Fuller, PLC (57) ABSTRACT

A steering wheel cover that includes an outer cover layer and an inner core layer coupled to the outer cover layer is disclosed herein. The inner core layer includes an inner surface shaped to form and self-maintain an annular channel sized to receiving an automobile steering wheel therein. The inner core layer has a composition that includes ethylene-vinyl acetate (EVA) and one or more hardening agents. The composition of the inner core layer may also include a flexibility agent, a de-molding agent, a flowing agent, an emollient, an oxidizing agent, a cross-linking agent, a coloring agent, a curing agent, and a foaming agent. The inner core layer may also include one or more ribs extending from an inner surface of the inner core layer.

14 Claims, 3 Drawing Sheets

STEERING WHEEL COVER

CROSS REFERENCE TO RELATED APPLICATIONS

This application is a continuation-in-part application of the earlier U.S. Utility Patent Application to He entitled "STEERING WHEEL COVER," application Ser. No. 13/623,211, filed Sep. 20, 2012, now pending, which claims priority to the foreign Chinese Application No. 201220296126.4, filed May 3, 2012, and issued on Aug. 7, 2013 as CN 203111288, the disclosures of which are hereby incorporated herein by reference.

BACKGROUND

1. Technical Field

Aspects of this document relate generally to steering wheel covers.

2. Background Art

Many drivers use steering wheel covers to enhance their driving experience. Many steering wheel covers, however, do not have the flexibility requirements sufficient to satisfy two components of utilization: flexible enough for easy installation of the steering wheel cover on a steering wheel and simultaneously strong enough to remain on the steering wheel once installed. Many steering wheel covers also often carry a very foul odor from the materials of the steering wheel cover, odors that subsequently permeate a foul smell throughout the vehicle. Steering wheel covers are also known to damage the steering wheel itself by transferring color from the inner core layer of the steering wheel cover to the steering wheel and/or otherwise marking or scratching the steering wheel.

SUMMARY

According to a first aspect, a steering wheel cover comprises an inner core layer and an outer core layer. The inner core layer comprises an inner surface shaped to form and self-maintain an annular channel sized to receive an automobile steering wheel therein, the inner core layer comprising ethylene-vinyl acetate (EVA) and one or more hardening agents. The outer cover layer is coupled to and conforms to an outer surface of the inner core layer.

Various implementations and embodiments of the steering wheel cover comprise one or more of the following. The composition of the core layer further comprises one or more first flexibility agents. The one or more hardening agents may comprise one or more thermoplastic polymers selected from the group consisting of acrylic, nylon, polyethylene, polypropylene, polystyrene, and polyvinyl chloride. The one or more first flexibility agents may comprise one or more elastomers. The one or more elastomers may comprise one or polyolefin elastomers. The composition of the inner core layer may comprise at least approximately 50 wt % of the EVA, at least approximately 7 wt % of the polyolefin elastomer, and at least approximately 2 wt % of the thermoplastic polymer. The composition of the inner core layer may comprise about 60 wt % to about 80 wt % of the EVA, about 1 wt % to about 8 wt % of the thermoplastic polymer, and about 6 wt % to about 20 wt % of the polyolefin elastomer. The thermoplastic polymer may comprise polyethylene and the composition may further comprise one or more of the following: a de-molding agent, a second flexibility agent, a flowing agent, one or more emollients, an oxidizing agent, a cross-linking agent, a coloring agent, a curing agent, and a foaming agent. The de-molding agent may comprise talcum powder, the second flexibility agent may comprise fiber cloth, the flowing agent may comprise paraffin, the one more emollients may comprise stearic acid and zinc stearate, the oxidizing agent may comprise zinc oxide, the cross-linking agent may comprise triaryl isocyanurate, the curing agent may comprise a solid masterbatch colorant, the curing agent may comprise dicumyl peroxide, and the foaming agent may comprise azodicarbonamide (ADCA). The composition of the inner core may comprises about 62 wt % to about 72 wt % of the EVA, about 2 wt % to about 6 wt % of the thermoplastic polymer, about 6 wt % to about 16 wt % of the polyolefin elastomer, about 5 wt % to about 16 wt % of the talcum powder, about 0 wt % to about 2 wt % of the fiber cloth, about 0 wt % to about 3 wt % of the paraffin, about 0 wt % to about 1 wt % of the stearic acid, about 0 wt % to about 1 wt % of the zinc stearate, about 0 wt % to about 2 wt % of the zinc oxide, about 0 wt % to about 1 wt % of the triaryl isocyanurate, about 0 wt % to about 1 wt % of the solid masterbatch colorant, about 0 wt % to about 2 wt % of the dicumyl peroxide, and about 0 wt % to about 0.1 wt % of the ADCA. A plurality of latitudinal or diagonal ribs protruding from an inner surface of the inner core layer. Each of the plurality of ribs may protrude between about 1/32 of an inch and about 1/8 of an inch from the inner surface of the inner core layer.

According to another aspect, a steering wheel cover inner core material composition comprises about 40 wt % to about 85 wt % of ethylene-vinyl acetate (EVA), about 1 wt % to about 20 wt % of one or more first flexibility agents, and about 1 wt % to about 20 wt % of one or more hardening agents.

Various implementations and embodiments of the steering wheel cover inner core material composition may comprise one or more of the following. The one or more hardening agents comprises one or more thermoplastic polymers selected from the group consisting of acrylic, nylon, polyethylene, polypropylene, polystyrene, and polyvinyl chloride. The one or more first flexibility agents comprise one or more elastomers. The one or more elastomers comprise one or polyolefin elastomers. The thermoplastic polymer comprises polyethylene and the composition further comprises one or more of the following: a de-molding agent, a second flexibility agent, a flowing agent, one or more emollients, an oxidizing agent, a cross-linking agent, a coloring agent, a curing agent, and a foaming agent. The de-molding agent comprises talcum powder, the second flexibility agent comprises fiber cloth, the flowing agent comprises paraffin, the one more emollients comprise stearic acid and zinc stearate, the oxidizing agent comprises zinc oxide, the cross-linking agent comprises triaryl isocyanurate, the coloring agent comprises a solid masterbatch colorant, the curing agent comprises dicumyl peroxide, and the foaming agent comprises azodicarbonamide (ADCA). The EVA comprises about 62 wt % to about 72 wt % of the steering wheel cover material, the thermoplastic polymer comprises about 2 wt % to about 6 wt % of the steering wheel cover material, the polyolefin elastomer comprises about 6 wt % to about 16 wt % of the steering wheel cover material, the talcum powder comprises about 5 wt % to about 16 wt % of the steering wheel cover material, the fiber cloth comprises about 0 wt % to about 2 wt % of the steering wheel cover material, the paraffin comprises about 0 wt % to about 3 wt % of the steering wheel cover material, the stearic acid comprises about 0 wt % to about 1 wt % of the steering wheel cover material, the zinc stearate comprises about 0 wt % to about 1 wt % of the steering wheel cover material, the zinc oxide comprises about 0 wt % to about 2 wt % of the steering wheel cover material, the triaryl isocyanurate comprises about 0 wt % to about 1 wt % of the steering wheel cover material, the solid masterbatch colorant comprises about 0 wt % to about 2 wt % of the steering wheel cover material, the dicumyl peroxide comprises about 0 wt % to about 2 wt % of the steering wheel cover material, and ADCA comprises about 0 wt % to about 0.1 wt % of the steering wheel cover material.

According to another aspect, a method of manufacturing a steering wheel cover comprises forming a steering wheel cover inner core by combining raw materials and molding the steering wheel cover inner core into a self-maintaining annular channel sized to receive an automobile steering wheel therein. The raw materials comprising at least ethylene-vinyl acetate (EVA), one or more hardening agents, and one or more first flexibility agents.

Various implementations and embodiments of the method may comprise one or more of the following. The one or more hardening agents may comprise one or more thermoplastic polymers selected from the group consisting of acrylic, nylon, polyethylene, polypropylene, polystyrene, and polyvinyl chloride, and the one or more first flexibility agents comprise one or more polyolefin elastomers. Combining the raw materials may comprise combining the EVA in an amount of about 60 wt % to about 80 wt %, the thermoplastic polymer in an amount of about 1 wt % to about 8 wt %, and the polyolefin elastomer in an amount of about 6 wt % to about 20 wt %. The raw materials may further comprise one or more of the following: a de-molding agent, a second flexibility agent, a flowing agent, one or more emollients, an oxidizing agent, a cross-linking agent, a coloring agent, a curing agent, and a foaming agent. The de-molding agent may comprise talcum powder, the second flexibility agent comprises fiber cloth, the flowing agent comprises paraffin, the one more emollients comprise stearic acid and zinc stearate, the oxidizing agent comprises zinc oxide, the cross-linking agent comprises triaryl isocyanurate, the coloring agent comprises a solid masterbatch colorant, the curing agent comprises dicumyl peroxide, and the foaming agent comprises azodicarbonamide (ADCA). Combining the raw materials may comprise combining the EVA in an amount of about 62 wt % to about 72 wt % of the steering wheel cover material, the thermoplastic polymer in an amount of about 2 wt % to about 6 wt % of the steering wheel cover material, the polyolefin elastomer in an amount of about 6 wt % to about 16 wt % of the steering wheel cover material, the talcum powder in an amount of about 5 wt % to about 16 wt % of the steering wheel cover material, the fiber cloth comprises in an amount of 0 wt % to about 2 wt % of the steering wheel cover material, the paraffin in an amount of about 0 wt % to about 3 wt % of the steering wheel cover material, the stearic acid in an amount of about 0 wt % to about 1 wt % of the steering wheel cover material, the zinc stearate in an amount of about 0 wt % to about 1 wt % of the steering wheel cover material, the zinc oxide comprises about 0 wt % to about 2 wt % of the steering wheel cover material, the triaryl isocyanurate in an amount of about 0 wt % to about 1 wt % of the steering wheel cover material, the solid masterbatch colorant in an amount of about 0 wt % to about 2 wt % of the steering wheel cover material, the dicumyl peroxide in an amount of about 0 wt % to about 2 wt % of the steering wheel cover material, and the ADCA in an amount of about 0 wt % to about 0.1 wt % of the steering wheel cover material. Molding the steering wheel cover material to form the inner core layer may comprise injection molding the steering wheel cover material to form a inner core layer with a plurality of latitudinal or diagonal ribs protruding from an inner surface of the inner core layer.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended steering wheel cover and/or assembly procedures for a steering wheel cover will become apparent for use with implementations of steering wheel covers from this disclosure. Accordingly, for example, although particular steering wheel covers are disclosed, such steering wheel covers and implementing components may comprise any shape, size, style, type, model, version, measurement, concentration, material, quantity, and/or the like as is known in the art for such steering wheel covers and implementing components, consistent with the intended operation of manufacturing a steering wheel cover.

Conventional steering wheel covers often carry a foul odor, are difficult to install onto a steering wheel due to their poor flexibility, and are undesirably mark the steering wheel. As shall be described in greater detail throughout this document, one or more embodiments of a steering wheel cover 2 contemplated herein comprise an inner core layer 6 having a composition that is flexible enough to allow a user to easily install the steering wheel cover 2 onto a steering wheel while simultaneously being strong enough to hold the steering wheel cover 2 in place on the steering wheel and self-maintain the shape of the inner core layer 6. Due to the improved composition of the inner core layer 6, embodiments of the steering wheel cover 2 contemplated herein also do not leave a foul odor in the vehicle.

Figure 1:
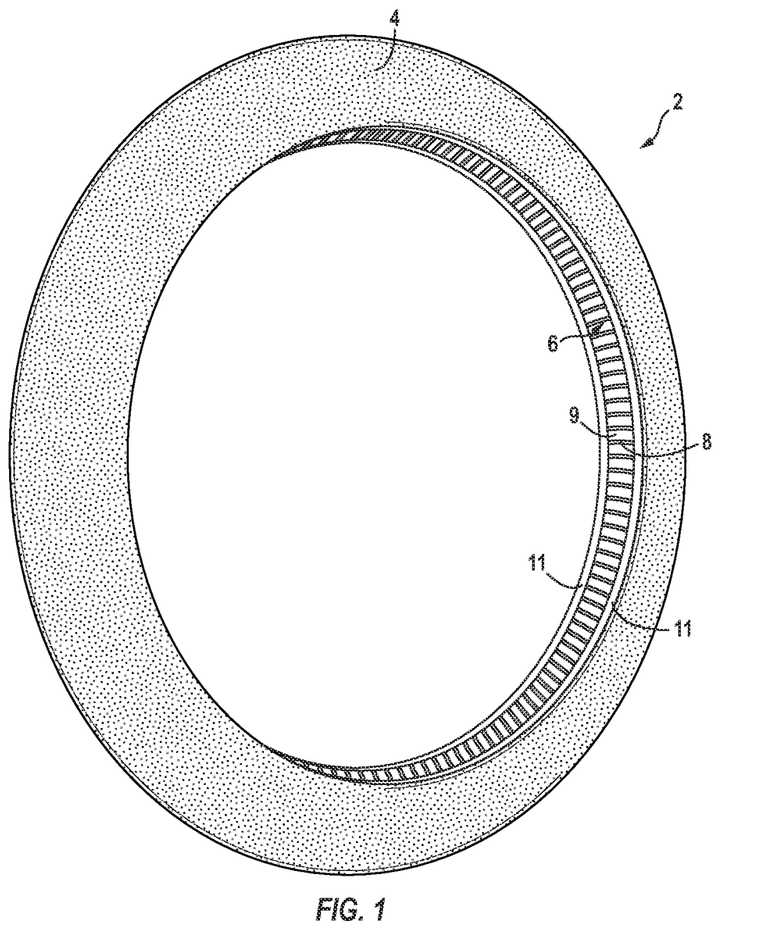
FIG. 1 is a perspective view of a steering wheel cover.
Figure 2:
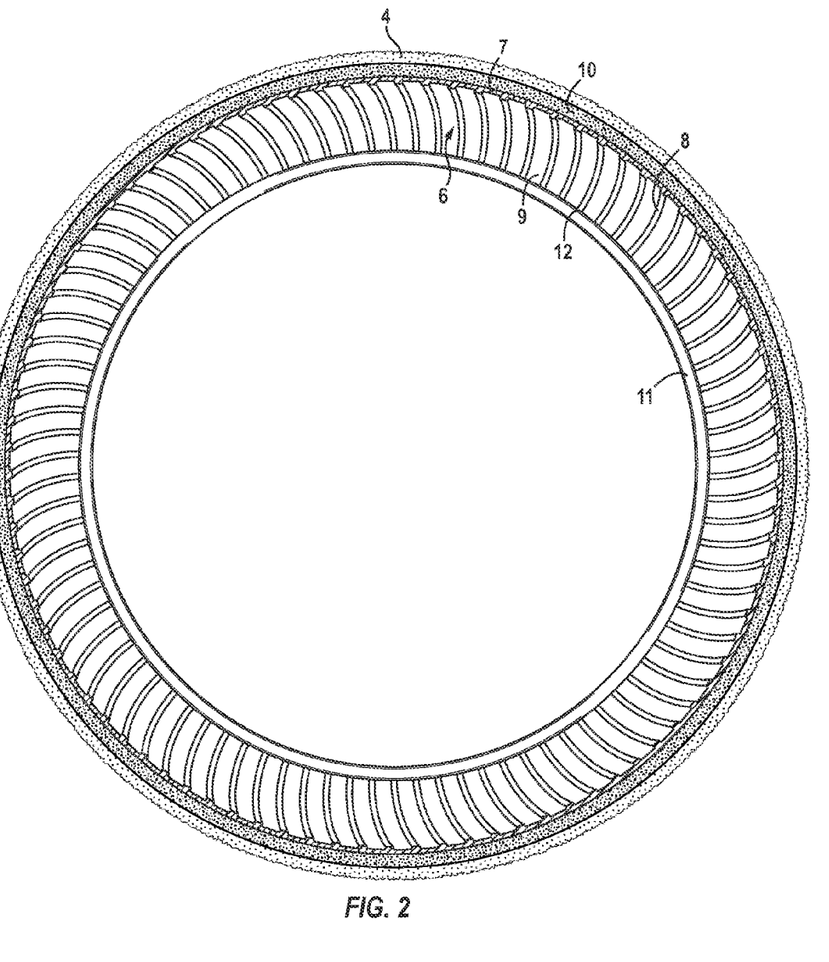
FIG. 2 is a cross sectional view of the steering wheel cover of FIG. 1.

As depicted in FIGS. 1 and 2, one or more embodiments of a steering wheel cover 2 comprise an outer cover layer 4 coupled to an inner core layer 6. The outer cover layer 4 may comprise any material previously known in the art of steering wheel covers, such as but not limited to genuine or synthetic leather, a vinyl type material, a shag-like material, a canvas-like material, a cloth-like material, and the like. In a particular embodiment, the outer cover layer 4 is coupled directly to an outer surface 7 of the inner core layer 6. Coupling of the outer cover layer 4 to the inner core layer 6 may be through use of an adhesive, a stitching, or any other mechanism of coupling previously known in the art. In the embodiment depicted in FIGS. 1 and 2, a fabric 11 wraps around the terminating ends 12 of the inner core layer 6 and the terminating ends of the outer cover layer 4. In particular embodiments, this fabric 11 is coupled to both the inner core layer 6 and the outer cover layer 4, thus coupling the two together. More particularly, the fabric 11 may be stitched to the outer cover layer 4 and the inner core layer 6.

One or more embodiments of a steering wheel cover 2 further comprise an optional cushioned layer 10 positioned between a least a portion of the inner core layer 6 and the outer cover layer. In other embodiments, the cushioned layer 10 is coupled directly to the inner core layer 6 but extends through an opening positioned on the outer cover layer 4 to allow the cushioned layer 10 to protrude therethrough. The cushioned layer 10 may comprise any type of cushioned material, such as but not limited to foam, gel, a cloth, air, and the like.

The inner core layer 6 typically comprise an inner surface 9 shaped to form and self-maintain an annular channel sized to receive an automobile steering wheel therein. The inner core layer 6 comprises a composition described in greater detail below that allows the inner core layer 6 to maintain its shape without any other support bodies or couplings. More specifically, the inner core layer 6 is comprises primarily EVA and is configured to maintain an inner surface 9 shaped to form an annular channel. In one or more embodiments, the inner core layer 6 comprises primarily EVA and at least one of a hardening agent and a flexibility agent that together form a flexible material that maintains its shape. Maintaining its shape means that the inner core layer maintains the shape it was molded to without requiring additional external support until physical force is applied to the inner core to deform the shape. Gravity acting alone on the inner core is not enough to deform its shape. The inclusion of the hardening agent in the primarily EVA material used to form the inner core enables the inner core to self-maintain its molded shape.

One or more embodiments of a steering wheel cover 2 further comprise an inner core layer 6 comprising a plurality of ribs 8 protruding from an inner surface 9 of the inner core layer 6. The plurality of ribs 8 may be arranged in any of a variety of directions, such as but not limited to latitudinal ribs and/or angled ribs. The plurality of ribs are, in certain embodiments, spaced an equal distance apart from one another. In particular embodiments, the ribs 8 are spaced less than approximately one inch from one another. In more particular embodiments, the ribs 8 are spaced less than approximately ½ of an inch from one another. In more particular embodiments, the ribs 8 are spaced less than approximately ¼ of an inch from one another. In more particular embodiments, the ribs 8 are spaced about ¼ of an inch from one another.

The plurality of ribs 8 are also, in particular embodiments, formed to protrude a substantially equal distance from the inner surface 9 of the inner core layer 6. Formation of the ribs 8 will be described in greater detail elsewhere in this document. In some embodiments, each of the plurality of ribs 8 protrudes between approximately ¹⁄₆₄ of an inch and approximately ¼ of an inch from the inner surface 9. In more particular embodiments, each of the plurality of ribs 8 protrudes between about ¹⁄₃₂ of an inch and approximately ⅛ of an inch from the inner surface 9. In more particular embodiments, each of the plurality of ribs 8 protrudes between about ¹⁄₁₆ of an inch and ⅛ of an inch from the inner surface 9. In more particular embodiments, each of the plurality of ribs 8 protrudes between about ¹⁄₁₆ and ¹⁄₃₂ of an inch from the inner surface 9.

Each of the plurality of ribs 8 also taper from the center of the rib 8 towards the terminating ends 12 of the inner core layer 6 in some embodiments. This rib 8 tapering feature allows for maximum traction to prevent slipping of the steering wheel cover 2 on the steering wheel, thus increasing friction between the inner core layer 6 and the steering wheel in an axial form to increase the coefficient of friction. Additionally, the steering wheel cover 2 is less bulky where the terminating ends 12 of the of the inner core layer 6 are positioned on the steering wheel cover 2, thus allowing for a better fit and easier gripping by the driver.

Also contemplated in this disclosure is an inner core layer 6 comprising a composition that comprises an improved flexibility and fewer or no foul odors when compared to conventional steering wheel covers. In particular, the modulus of elasticity of the inner core layer 6 is low relative to conventional steer wheel covers, resulting in a greater flexibility of the steering wheel cover 2. In one or embodiments, the hardness of the inner core layer 6 is between approximately 55 and 75 degrees on the A scale. In a more particular aspect, the hardness of the inner core layer 6 is between approximately 60 and 70 degrees. In alternative embodiments, the hardness of the inner core layer is less than 55 degrees.

Also absent from one or more embodiments of the inner core layer 6 composition is a color dye, thus inhibiting or otherwise preventing color migration from the steering wheel cover 2 to a steering wheel. Embodiments of the inner core layer 6 disclosed herein also provide improved shock absorption and cushioning to the driver.

In one or more embodiments, the composition of the inner layer comprises a combination of at least ethylene-vinyl acetate (EVA) and a hardening agent. According to one aspect, the amount of EVA in the composition of the inner core layer 6 comprises at least approximately 50 wt %. In another aspect, the composition of the inner core layer 6 comprises about 60 wt % to about 80 wt % EVA. In still another aspect, the composition of the inner core layer 6 comprises about 62 wt % to about 72 wt % EVA. In still a more particular aspect, the composition of the inner core layer 6 comprises about 66 wt % to about 69 wt % EVA. In still a more particular aspect, the composition of the inner core layer 6 comprises approximately 67.5 wt % EVA.

The hardening agent in the composition of the inner core layer 6 may comprise any hardening agent previously known in the art. The one or more hardening agents allow the steering wheel cover 2 to maintain its substantially circular shape, even after flexing to fit on the steering wheel. The one or more hardening agents are also in a quantity sufficient to allow the inner core layer 6 to self-maintain its annular shape, including the annular channel. In one or more embodiments, the hardening agent comprises one or more thermoplastic polymers. The one or more thermoplastic polymers comprise at least one of the following: acrylic, nylon, polyethylene, polypropylene, polystyrene, and/or polyvinyl chloride. According to one aspect, the amount of hardening agent in the composition of the inner core layer 6 comprises at least 2 wt %. In another aspect, the composition of the inner core comprises about 1 wt % to about 8 wt % hardening agent. In still another aspect, the composition of the inner core layer 6 comprises about 2 wt % to about 6 wt % hardening agent. In still a more particular aspect, the composition of the inner core layer 6 comprises about 3 wt % to about 5 wt % hardening agent. In still a more particular aspect, the composition of the inner core layer comprises approximately 4 wt % hardening agent.

In one or more embodiments, the composition of the inner core layer 6 further comprises one or more first flexibility agents. The one or more first flexibility agents may comprise any flexibility agent configured to maintain the high flexibility of the inner core layer 6. In a particular embodiment, the one or more first flexibility agents comprise one or more elastomers. In more particular embodiments, the one or more first flexibility agents comprise one or more polyolefin elastomers. The one or more polyolefin elastomers comprise one or more of the following: polyisobutylene, ethylene propylene rubber, and/or ethylene propylene diene monomer rubber. According to one aspect, the amount of first flexibility agent in the composition of the inner core layer 6 comprises at least approximately 7 wt %. In another aspect, the composition of the inner core layer 6 comprises about 6 wt % to about 20 wt % first flexibility agent. In still another aspect, the composition of the inner core layer 6 comprises about 6 wt % to about 16 wt % first flexibility agent. In still a more particular aspect, the composition of the inner core layer 6 comprises about 9 wt % to about 14 wt % first flexibility agent. In still a more particular aspect, the composition of the inner core layer 6 comprises approximately 11.5 wt % first flexibility agent.

In one or more embodiments, the composition of the inner core layer 6 further comprises one or de-molding agents that help prevent the inner core layer from sticking in the mold during formation of the inner core layer 6. The de-molding agent may comprise talcum powder, ground calcium carbonate, or any other de-molding agents known in the art. According to one aspect, the amount of de-molding agent in the composition of the inner core layer 6 comprises about 0 wt % to about 20 wt % de-molding agent. In still another aspect, the composition of the inner core layer 6 comprises about 5 wt % to about 16 wt % de-molding agent. In still a more particular aspect, the composition of the inner core layer 6 comprises about 9 wt % to about 13 wt % de-molding agent. In still a more particular aspect, the composition of the inner core layer comprises approximately 11 wt % de-molding agent.

In one or more embodiments, the composition of the inner core layer 6 further comprises one or more second flexibility agents. The second flexibility agent may comprise fiber cloth, an EVA material, or any other flexibility agent known in the art. According to one aspect, the amount of second flexibility agent in the composition of the inner core layer 6 comprises about 0 wt % to about 5 wt % second flexibility agent. In still another aspect, the composition of the inner core layer 6 comprises about 0.25 wt % to about 2 wt % second flexibility agent. In still a more particular aspect, the composition of the inner core layer 6 comprises about 0.5 wt % to about 1.5 wt % second flexibility agent. In still a more particular aspect, the composition of the inner core layer comprises approximately 0.96 wt % second flexibility agent.

In one or more embodiment, the composition of the inner core layer 6 further comprises one or more flowing agents. The flowing agent may comprise paraffin or any other flowing agent previously known in the art that decreases the feeding time and/or increases the feeding speed during production. According to one aspect, the amount of flowing agent in the composition of the inner core layer 6 comprises about 0 wt % to about 5 wt % flowing agent. In still another aspect, the composition of the inner core layer 6 comprises about 0.5 wt % to about 3 wt % flowing agent. In still a more particular aspect, the composition of the inner core layer 6 comprises about 1 wt % to about 2 wt % flowing agent. In still a more particular aspect, the composition of the inner core layer comprises approximately 1.66 wt % flowing agent.

In one or more embodiments, the composition of the inner core layer 6 further comprises one or more emollients. In a particular embodiment, the emollients comprise one or more of the following: stearic acid and/or zinc stearate or any other compound or composition known in the art that reduces the stickiness of the inner core layer 6 during production. In particular embodiments, the emollient is a non-toxic emollient derived from, for example, palm oil. According to one aspect, the amount of emollients in the composition of the inner core layer 6 comprises about 0 wt % to about 5 wt % emollients. In still another aspect, the composition of the inner core layer 6 comprises about 0.1 wt % to about 3 wt % emollients. In still a more particular aspect, the composition of the inner core layer 6 comprises about 0.1 wt % to about 1 wt % emollients. In still a more particular aspect, the composition of the inner core layer comprises approximately 0.57 wt % emollients. Moreover, according to one aspect, the composition of the inner core layer 6 comprises about 0.1 wt % to about 1.0 wt % stearic acid and about 0.05 wt % to about 0.5 wt % zinc stearate. In another aspect, the composition of the inner core layer 6 comprises about 0.3 wt % to about 0.5 wt % stearic acid and about 0.1 wt % to about 0.2 wt % zinc stearate. In still another aspect, the composition of the inner core layer 6 comprises about 0.41 wt % stearic acid and about 0.16 wt % zinc stearate.

In one or more embodiments, the composition of the inner core layer 6 further comprises one or more oxidizers. In a particular embodiment, the oxidizer comprises zinc oxide. According to one aspect, the amount of oxidizers in the composition of the inner core layer 6 comprises about 0 wt % to about 2 wt % oxidizers. In still another aspect, the composition of the inner core layer 6 comprises about 0.5 wt % to about 2.5 wt % oxidizers. In still a more particular aspect, the composition of the inner core layer 6 comprises about 1.0 wt % to about 1.75 wt % oxidizers. In still a more particular aspect, the composition of the inner core layer comprises approximately 1.32 wt % oxidizers.

In one or more embodiments, the composition of the inner core layer 6 further comprises one or more cross-linking agents. The cross-linking agent may comprise any agent or compound for cross-linking EVA such that the final inner core layer 6 comprises an improved heat resistance, flame resistance, solvent resistance, and resistance to deformation. In a particular embodiment, the cross-linking agent comprises triaryl-isocyanurate (TALC). According to one aspect, the amount of cross-linking agents in the composition of the inner core layer 6 comprises about 0 wt % to about 1 wt % cross-linking agents. In still another aspect, the composition of the inner core layer 6 comprises about 0.05 wt % to about 0.5 wt % cross-linking agents. In still a more particular aspect, the composition of the inner core layer 6 comprises about 0.06 wt % to about 0.25 wt % cross-linking agents. In still a more particular aspect, the composition of the inner core layer comprises approximately 0.12 wt % cross-linking agents.

In one or more embodiments, the composition of the inner core layer 6 further comprises one or more curing agents. The one or more curing agents may comprise any agent or compound that assists in formation of an EVA foam with more uniform bubbles. The one or more curing agents may also improve the heat resistance and weather resistance of the inner core layer 6. In a particular embodiment, the one or more curing agents comprise dicumyl peroxide (DCP). According to one aspect, the amount of curing agents in the composition of the inner core layer 6 comprises about 0 wt % to about 3 wt % curing agents. In still another aspect, the composition of the inner core layer 6 comprises about 0.4 wt % to about 2 wt % curing agents. In still a more particular aspect, the composition of the inner core layer 6 comprises about 0.6 wt % to about 1.0 wt % curing agents. In still a more particular aspect, the composition of the inner core layer comprises approximately 0.82 wt % curing agents.

In one or more embodiments, the composition of the inner core layer 6 further comprises one or more coloring agents. The one or more coloring agents may comprise a masterbatch colorant or any other colorant known in the art that at least partially controls the color of the final inner core layer 6. In a particular embodiment, the masterbatch colorant comprises a solid colorant. According to one aspect, the amount of coloring agents in the composition of the inner core layer 6 comprises about 0 wt % to about 2 wt % coloring agents. In still another aspect, the composition of the inner core layer 6 comprises about 0.25 wt % to about 2 wt % coloring agents. In still a more particular aspect, the composition of the inner core layer 6 comprises about 0.4 wt % to about 0.7 wt % coloring agents. In still a more particular aspect, the composition of the inner core layer comprises approximately 0.54 wt % coloring agents. A color paste may be utilized to dye any fabrics used in the steering wheel cover.

In one or more embodiments, the composition of the inner core layer 6 further comprises one or more foaming agents. In a particular embodiment, the foaming agent comprises azodicarbonamide (ADCA). According to one aspect, the amount of foaming agents in the composition of the inner core layer 6 comprises about 0 wt % to about 0.1 wt % foaming agents. In still another aspect, the composition of the inner core layer 6 comprises about 0.005 wt % to about 0.05 wt % foaming agents. In still a more particular aspect, the composition of the inner core layer 6 comprises about 0.007 wt % to about 0.015 wt % foaming agents. In still a more particular aspect, the composition of the inner core layer comprises approximately 0.01 wt % foaming agents.

Also contemplated, as part of this disclosure, is a method of manufacturing a steering wheel cover 2. Various embodiments of the inner core layer 6 are manufactured through an injection molding process, which is highly advantageous to the extrusion process of conventional steering wheel covers. Because the inner core layer 6 is formed through injection molding, the ribs 8 previously described herein may be formed during the actual molding process. Furthermore, these ribs may be formed to advantageous sizes and configurations when compared to anything known in the prior art. For example, in one or more embodiments, each of the plurality of ribs 8 are tapered, as described above. This tapering feature of the ribs 8 is not possible in conventional steering wheel covers formed through an extrusion process.

Figure 3:
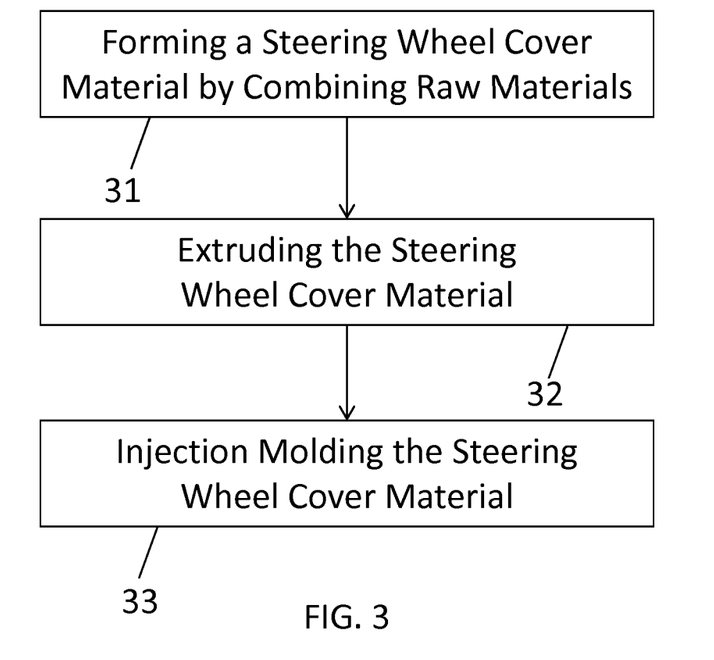
FIG. 3 is flowchart of a method manufacturing a steering wheel cover material.

As diagrammed in the flowchart of FIG. 3, in one or more embodiments a method of manufacturing a steering wheel cover 2 comprises forming a steering wheel cover material by combining one or more raw materials (step 31). The raw materials comprise at least EVA, one or more of the hardening agents, and one or more of the first flexibility agents. In one or more embodiments, the raw materials further comprise one or more of the following: a de-molding agent, a second flexibility agent, a flowing agent, one or more emollients, an oxidizing agent, a cross-linking agent, a coloring agent, a foaming agent, and/or a curing agent. The amounts of raw materials used in forming the steering wheel cover material may be as described elsewhere in this document.

Combining the raw materials comprises, in one or more embodiments, mixing them together before being pelletized by any machine known in the art. More particularly, mixing the raw materials comprises adding the raw materials into an automatic feeding machine according to one aspect, sometimes in granular EVA form. The automatic delivery machine may be preset to a desired rate of delivery. The raw materials are typically extruded with an extruder (step 32), such as but not limited to a double screw extruder. The automatic delivery machine may be configured to perform one or more of the following during production of the inner core layer 6: melting, conveying, kneading, mixing, and extruding.

As noted above, an embodiment of a method may further comprise molding the steering wheel cover material (step 33) to form an inner core layer 6 comprising a self-maintaining annular channel sized to receive an automobile steering wheel therein. The molding may comprise injection molding or any other molding known in the art. In one or more embodiments, a method further comprises coupling an outer cover layer 4 to the inner core layer 6. Coupling the outer cover layer 4 to the inner core layer 6 may comprise stitching the outer cover layer 4 to the inner core layer 6 or coupling the outer cover layer 4 to the inner core layer 6 with one or more adhesives.

It will be understood that implementations are not limited to the specific components disclosed herein, as virtually any components consistent with the intended operation of a method and/or system implementation for steering wheel cover may be utilized. Accordingly, for example, although particular steering wheel covers may be disclosed, such components may comprise any shape, size, style, type, model, version, class, grade, measurement, concentration, material, weight, quantity, and/or the like consistent with the intended operation of a method and/or system implementation for a steering wheel cover may be used.

In places where the description above refers to particular implementations of steering wheel covers, it should be readily apparent that a number of modifications may be made without departing from the spirit thereof and that these implementations may be applied to other steering wheel covers. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A steering wheel cover, comprising:
   an inner core layer comprising an inner surface shaped to form and self-maintain an annular channel sized to receive an automobile steering wheel therein, the inner core layer comprising ethylene-vinyl acetate (EVA) and further comprising one or more hardening agents; and
   an outer cover layer coupled to and conforming to an outer surface of the inner core layer,
   wherein the composition of the inner core layer further comprises one or more first flexibility agents,
   wherein the one or more hardening agents comprises one or more thermoplastic polymers selected from the group consisting of acrylic, nylon, polyethylene, polypropylene, polystyrene, and polyvinyl chloride,
   wherein the one or more first flexibility agents comprise one or more elastomers,
   wherein the one or more elastomers comprise one or polyolefin elastomers,
   wherein the composition of the inner core layer comprises about 60 wt % to about 80 wt % of the EVA, about 1 wt % to about 8 wt % of the thermoplastic polymer, and about 6 wt % to about 20 wt % of the polyolefin elastomer, wherein the thermoplastic polymer comprises polyethylene and the composition further comprises one or more of the following: a de-molding agent, a second flexibility agent, a flowing agent, one or more emollients, an oxidizing agent, a cross-linking agent, a coloring agent, a curing agent, and a foaming agent, and wherein the de-molding agent comprises talcum powder, the second flexibility agent comprises fiber cloth, the flowing agent comprises paraffin, the one more emollients comprise stearic acid and zinc stearate, the oxidizing agent comprises zinc oxide, the cross-linking agent comprises triaryl isocyanurate, the curing agent comprises a solid masterbatch colorant, the curing agent comprises dicumyl peroxide, and the foaming agent comprises azodicarbonamide (ADCA).

2. The steering wheel cover of claim 1, wherein the composition of the inner core comprises:
about 62 wt % to about 72 wt % of the EVA;
about 2 wt % to about 6 wt % of the thermoplastic polymer;
about 6 wt % to about 16 wt % of the polyolefin elastomer;
about 5 wt % to about 16 wt % of the talcum powder;
about 0.25 wt % to about 2 wt % of the fiber cloth;
about 0.5 wt % to about 3 wt % of the paraffin;
about 0.1 wt % to about 1 wt % of the stearic acid;
about 0.05 wt % to about 1 wt % of the zinc stearate;
about 0.5 wt % to about 2 wt % of the zinc oxide;
about 0.05 wt % to about 1 wt % of the triaryl isocyanurate;
about 0 wt % to about 1 wt % of the solid masterbatch colorant;
about 0.4 wt % to about 2 wt % of the dicumyl peroxide; and
about 0.005 wt % to about 0.1 wt % of the ADCA.

3. The steering wheel cover of claim 1, further comprising a plurality of latitudinal or diagonal ribs protruding from an inner surface of the inner core layer.

4. The steering wheel cover of claim 3, wherein each of the plurality of ribs protrudes between about 1/32 of an inch and about 1/8 of an inch from the inner surface of the inner core layer.

5. A steering wheel cover inner core material composition, comprising:
about 40 wt % to about 85 wt % of ethylene-vinyl acetate (EVA);
about 0.05 wt % to about 0.5 wt % of one or more cross-linking agents;
about 1 wt % to about 20 wt % of one or more first flexibility agents; and
about 1 wt % to about 20 wt % of one or more hardening agents.

6. The steering wheel cover inner core material composition of claim 5, wherein the one or more hardening agents comprises one or more thermoplastic polymers selected from the group consisting of acrylic, nylon, polyethylene, polypropylene, polystyrene, and polyvinyl chloride.

7. The steering wheel cover inner core material of claim 6, wherein the one or more first flexibility agents comprise one or more elastomers.

8. The steering wheel cover inner core material of claim 7, wherein the one or more elastomers comprise one or polyolefin elastomers.

9. The steering wheel cover inner core material of claim 8, wherein the thermoplastic polymer comprises polyethylene and the composition further comprises one or more of the following: a de-molding agent, a second flexibility agent, a flowing agent, one or more emollients, an oxidizing agent, a coloring agent, a curing agent, and a foaming agent.

10. The steering wheel cover inner core material of claim 9, wherein the de-molding agent comprises talcum powder, the second flexibility agent comprises fiber cloth, the flowing agent comprises paraffin, the one more emollients comprise stearic acid and zinc stearate, the oxidizing agent comprises zinc oxide, the cross-linking agent comprises triaryl isocyanurate, the coloring agent comprises a solid masterbatch colorant, the curing agent comprises dicumyl peroxide, and the foaming agent comprises azodicarbonamide (ADCA).

11. The steering wheel cover inner core material of claim 10, wherein the EVA comprises about 62 wt % to about 72 wt % of the steering wheel cover material, the thermoplastic polymer comprises about 2 wt % to about 6 wt % of the steering wheel cover material, the polyolefin elastomer comprises about 6 wt % to about 16 wt % of the steering wheel cover material, the talcum powder comprises about 5 wt % to about 16 wt % of the steering wheel cover material, the fiber cloth comprises about 0.25 wt % to about 2 wt % of the steering wheel cover material, the paraffin comprises about 0.5 wt % to about 3 wt % of the steering wheel cover material, the stearic acid comprises about 0.1 wt % to about 1 wt % of the steering wheel cover material, the zinc stearate comprises about 0.05 wt % to about 1 wt % of the steering wheel cover material, the zinc oxide comprises about 0.5 wt % to about 2 wt % of the steering wheel cover material, the triaryl isocyanurate comprises about 0.05 wt % to about 1 wt % of the steering wheel cover material, the solid masterbatch colorant comprises about 0 wt % to about 2 wt % of the steering wheel cover material, the dicumyl peroxide comprises about 0.4 wt % to about 2 wt % of the steering wheel cover material, and ADCA comprises about 0.005 wt % to about 0.1 wt % of the steering wheel cover material.

12. A method of manufacturing a steering wheel cover, the method comprising:
forming a steering wheel cover inner core by combining raw materials, the raw materials comprising at least ethylene-vinyl acetate (EVA), one or more hardening agents, and one or more first flexibility agents; and
molding the steering wheel cover inner core into a self-maintaining annular channel sized to receive an automobile steering wheel therein,
wherein the raw materials further comprise one or more of the following: a de-molding agent, a second flexibility agent, a flowing agent, one or more emollients, an oxidizing agent, a cross-linking agent, a coloring agent, a curing agent, and a foaming agent, and
wherein the de-molding agent comprises talcum powder, the second flexibility agent comprises fiber cloth, the flowing agent comprises paraffin, the one more emollients comprise stearic acid and zinc stearate, the oxidizing agent comprises zinc oxide, the cross-linking agent comprises triaryl isocyanurate, the coloring agent comprises a solid masterbatch colorant, the curing agent comprises dicumyl peroxide, and the foaming agent comprises azodicarbonamide (ADCA).

13. The method of claim 12, wherein combining the raw materials comprises combining the EVA in an amount of about 62 wt % to about 72 wt % of the steering wheel cover material, the thermoplastic polymer in an amount of about 2 wt % to about 6 wt % of the steering wheel cover material, the polyolefin elastomer in an amount of about 6 wt % to about 16 wt % of the steering wheel cover material, the talcum powder in an amount of about 5 wt % to about 16 wt % of the steering wheel cover material, the fiber cloth comprises in an amount of 0 wt % to about 2 wt % of the steering wheel cover material, the paraffin in an amount of about 0 wt % to about 3 wt % of the steering wheel cover material, the stearic acid in an amount of about 0 wt % to about 1 wt % of the steering wheel cover material, the zinc stearate in an amount of about 0 wt % to about 1 wt % of the steering wheel cover material, the zinc oxide comprises about 0 wt % to about 2 wt % of the steering wheel cover material, the triaryl isocyanurate in an amount of about 0 wt % to about 1 wt % of the steering wheel cover material, the solid masterbatch colorant in an amount of about 0 wt % to about 2 wt % of the steering wheel cover material, the dicumyl peroxide in an amount of about 0 wt % to about 2 wt % of the steering wheel cover material, and the ADCA in an amount of about 0 wt % to about 0.1 wt % of the steering wheel cover material.

14. The method of claim 12, wherein molding the steering wheel cover material to form the inner core layer comprises injection molding the steering wheel cover material to form the inner core layer with a plurality of latitudinal or diagonal ribs protruding from an inner surface of the inner core layer.

\* \* \* \* \*